United States Patent [19]

Arai et al.

[11] Patent Number: 5,229,900

[45] Date of Patent: Jul. 20, 1993

[54] MAGNETOOPTICAL DISK DRIVE HAVING IMPROVED FEATURES FOR REDUCING THE SIZE THEREOF IN THE DIRECTION NORMAL TO THE DISK CARTRIDGE

[75] Inventors: Norimasa Arai, Katsushika; Noriyoshi Kokubo, Ebina, both of Japan

[73] Assignee: Victor Company of Japan, Ltd., Yokohama, Japan

[21] Appl. No.: 585,799

[22] Filed: Sep. 21, 1990

[30] Foreign Application Priority Data

Sep. 22, 1989 [JP] Japan .................. 1-246872

[51] Int. Cl.⁵ .................. G11B 5/016; G11B 17/04; G11B 23/03
[52] U.S. Cl. .................. 360/99.02; 360/99.06; 360/133; 369/77.2
[58] Field of Search .................. 360/99.02, 99.06, 114, 360/133, 99.03, 99.07; 369/77.2, 77.1, 270

[56] References Cited

U.S. PATENT DOCUMENTS

| | | | |
|---|---|---|---|
| 4,710,829 | 12/1987 | Shimaoka et al. | 360/99.06 |
| 4,740,937 | 4/1988 | Watanabe | 369/270 |
| 4,858,050 | 8/1989 | Ashe et al. | 360/133 |
| 4,899,238 | 2/1990 | Inoue et al. | 360/99.06 |
| 4,953,042 | 8/1990 | Yoshikawa | 360/99.02 |
| 4,984,225 | 1/1991 | Ando | 360/114 |
| 5,051,857 | 9/1991 | Akiyama | 360/133 |

*Primary Examiner*—Stuart S. Levy
*Assistant Examiner*—Jefferson Evans
*Attorney, Agent, or Firm*—Jacobson, Price, Holman & Stern

[57] ABSTRACT

A disk drive (30) for use with a magnetooptical disk cartridge (10) having a magnetooptical data storage disk (12) rotatably enclosed in a generally flat, boxlike housing (14), a sliding shutter (16) mounted astraddle one edge thereof for opening and closing a pair of disk access windows (22, 24) in opposite sides of the housing. The disk drive has a cartridge cardle (38, 138) for receiving the disk cartridge as the latter is inserted in an entrance slot (36) in the disk drive casing (32, 132). Pivotally mounted to the cartridge cradle a shutter opening lever (46) opens the cartridge shutter (16) well before the disk cartridge (10) is fully inserted through the entrance slot. The electromagnet assembly (68, 168) of the magnetooptical disk drive, by which a magnetic field is generated for biasing the disk during data transfer with an optical data transducer, is positioned sufficiently close to the loaded disk cartridge (10) to appeciably reduce the height or thickness dimension of the disk drive.

2 Claims, 8 Drawing Sheets

MAGNETOOPTICAL DISK DRIVE HAVING IMPROVED FEATURES FOR REDUCING THE SIZE THEREOF IN THE DIRECTION NORMAL TO THE DISK CARTRIDGE

BACKGROUND OF THE INVENTION

This invention relates generally to rotating disk data storage apparatus, and particularly to a disk drive for use with magnetooptical disks packaged in cartridge form with a sliding shutter. Still more particularly, the invention deals with improvements in such a magnetooptical disk drive designed to realize an appreciable reduction in the height or thickness dimension of the disk drive, by which is meant the dimension in a direction perpendicular to the plane of the magnetooptical disk loaded in the disk drive.

Magnetooptical disks with their erasable and rewritable capabilities have won extensive commercial acceptance in recent years as compact storage media of both computer data and user data. Such disks are available today in a variety of sizes, ranging from those as large as twelve inches in diameter to those as small as five and a quarter inches and three and a half inches in diameter. Usually, the disks are rotatably enveloped in generally flat, boxlike housings of plastics material complete with a sliding sheet-metal shutter to open and close access windows in the opposite sides of the housing.

The disk drive for use with such relatively small size disk cartridges has an entrance slot in its front face for the insertion of the disk cartridge in a horizontal plane. Mounted within the disk drive casing, a cartridge cradle receives the disk cartridge inserted in the entrance slot. The cartridge cradle has pivotally mounted thereon a shutter lever whereby, as heretofore constructed, the sliding shutter of the disk cartridge has been fully opened upon full insertion of the disk cartridge in the entrance slot. Then the cartridge cradle with the disk cartridge loaded therein is subsequently lowered to carry the disk cartridge down to a data transfer position in which the magnetooptical data storage disk is put to data transfer with an optical data transducer. This transducer utilizes a laser beam for reading, writing and erasing data on the magnetooptical disk.

Another standard component of the magnetooptical disk drive is an electromagnet assembly for generating a magnetic field which is necessary for biasing the disk during its data transfer with the optical data transducer. Normally, the electromagnet assembly is held in a standby position within the disk drive casing, in which position the electromagnet assembly overhangs the cartridge cradle being held in its raised position. After the loading of the disk cartridge in the cartridge cradle, the electromagnet assembly is lowered with the disk cartridge over a distance greater than the distance of descent of the disk cartridge, for applying a magnetic field to the disk through one of the access windows in the cartridge housing.

It is the above noted standby position of the electromagnet assembly over the cartridge cradle that has been an impediment to the reduction of the height or thickness dimension of the magnetooptical disk drive. However, this arrangement is per se desirable for the simplicity of the supporting and actuating mechanisms of the electromagnet assembly and for the reduction of the overall size of the disk drive, as the electromagnet assembly is required to move only up and down. An approach other than changing the standby position of the electromagnet assembly is therefore needed for the height reduction of the disk drive.

SUMMARY OF THE INVENTION

It is an object of the present invention to reduce the height or thickness dimension of the magnetooptical disk drive of the kind defined without altering the arrangement of the electromagnet assembly, or of any equivalent field generating means, over the cartridge cradle, and hence without making the disk drive any more complex in construction than heretofore.

Briefly, the invention may be summarized as a disk drive for use with a magnetooptical disk cartridge of the type having a magnetooptical data storage disk rotatably enclosed in a generally flat, boxlike housing having a sliding shutter mounted astraddle one edge of the housing to open and close a pair of access windows formed in the opposite sides of the housing.

More specifically, the invention provides the improved combination in such a magnetooptical disk drive including a casing having an entrance opening for the insertion of the magnetooptical disk cartridge. The disk cartridge is to be inserted, with said one edge of the cartridge housing forward in the direction of insertion through the entrance opening to a fully loaded position within the casing via a semiloaded position which is spaced a preassigned distance from the fully loaded position toward the entrance opening. So inserted in the entrance opening, the disk cartridge is received in a cartridge cradle within the casing. Shutter opening means is provided for opening the shutter of the disk cartridge being inserted in the entrance opening, by the time the disk cartridge arrives at the semiloaded position. Also included is an electromagnet or like field generating means for generating a magnetic field for biasing the data storage disk of the disk cartridge through one of the access windows in the housing of the disk cartridge. The field generating means is held, during the loading of the disk cartridge, in a predetermined standby position such that the one window in the cartridge housing is positioned opposite the field generating means when the disk cartridge arrives at the fully loaded position.

It should be noted that the shutter opening means fully opens the shutter of the disk cartridge when the latter arrives at the semiloaded position, instead of when the cartridge arrives at the fully loaded position as in the prior art. The disk cartridge subsequently travels from the semiloaded position to the fully loaded position with its shutter held open. Therefore, by creating suitable recesses in the housing and shutter of the disk cartridge, as will be disclosed subsequently, the standby position of the field generating means can be made closer to the loaded disk cartridge, in a direction normal to the plane of the disk cartridge, than if the shutter were fully opened when the disk cartridge arrived at the fully loaded position as in the prior art.

Thus an appreciable reduction can be achieved in the disk drive dimension in a direction normal to the plane of the disk cartridge loaded therein. Such a compact disk drive gives a greater latitude in the design of a personal computer or like host machine into which it may be built.

BRIEF DESCRIPTION IN THE DRAWINGS

The above and other features and advantages of this invention and the manner of realizing them will become more apparent, and the invention itself will best be understood, from a study of the following description and appended claims, with reference to the accompanying drawings showing some preferable embodiments of the invention and wherein FIG. 1 is a perspective view of the magnetooptical disk cartridge suitable for use with the disk drive constructed in accordance with the present invention and showing the disk cartridge with its sliding shutter closed;

DESCRIPTION OF THE PREFERRED EMBODIMENTS

Figure 1:
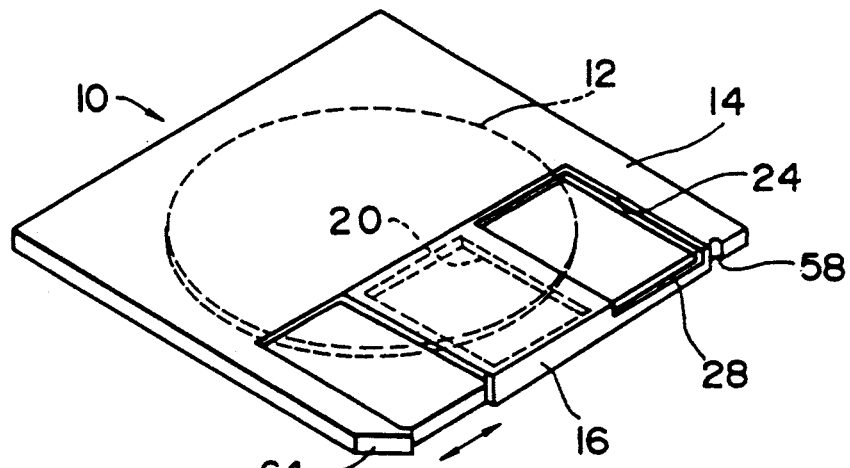
Figure 2:
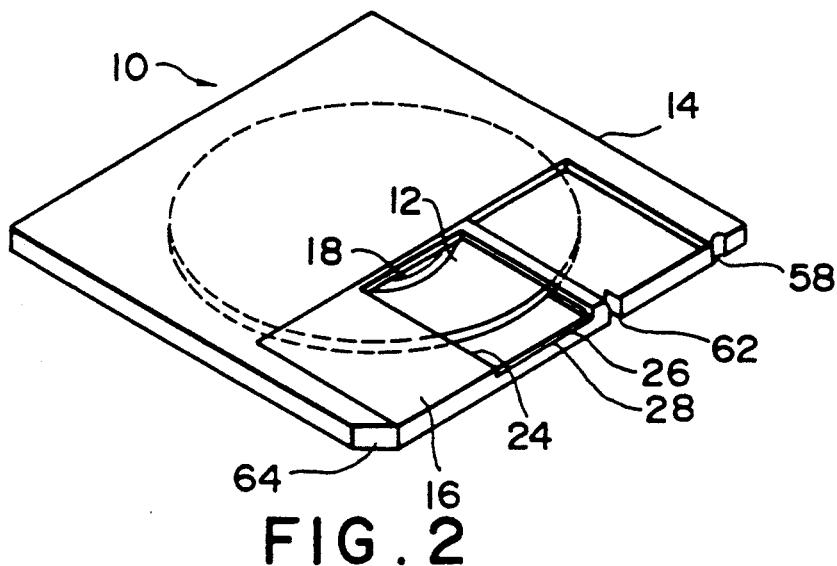
FIG. 2 is a view similar to FIG. 1 except that the disk cartridge is shown with its shutter open.
Figure 3:
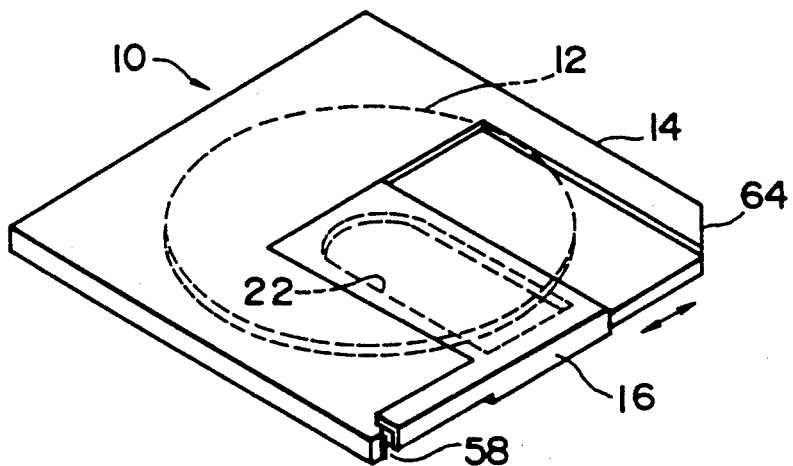
FIG. 3 is a perspective view showing that side of the disk cartridge opposite to the side shown in FIGS. 1 and 2 with the shutter of the disk cartridge closed.

The construction of the magnetooptical disk drive according to this invention will be better understood by first describing the disk cartridge for use therewith. As illustrated in FIGS. 1–3, the disk cartridge 10 has a magnetooptical data storage disk 12 rotatably enveloped in a generally thin, substantially boxlike housing 14 of a plastic. A sheet-metal shutter 16 is slidably mounted astride one edge of the cartridge housing 14.

The magnetooptical data storage disk 12 can be of any known or suitable construction. Typically, it has a transparent plastic base, such as of polycarbonate, on which there is formed a superposition of a magnetooptical film and a protective covering. The magnetooptical film, on and from which data is to be stored and retrieved by the known magnetooptical effect, may be of any suitable compositions such as those comprising iron, cobalt, terbium or gadolinium. The protective covering may be of a synthetic resin that hardens on exposure to ultraviolet radiation.

FIG. 2 partly reveals a metal-made hub 18 attached centrally to the data storage disk 12. Data is to be written on a predetermined storage zone of the magnetooptical disk 12 around the disk hub 18, either in the form of a single multiturn spiral track or of a multiplicity of concentric annular tracks.

This disk cartridge 10 is to be inserted horizontally in the disk drive constructed in accordance with the invention, with its side shown in FIGS. 1 and 2 directed upwardly. The cartridge side shown in FIGS. 1 and 2 will therefore be hereinafter referred to as the top side, and the opposite cartridge side shown in FIG. 3 as the bottom side.

The cartridge housing 14 has a disk access window 20 in its top side, and another similar window 22 in its bottom side, to expose radial portions of the opposite major surfaces of the disk 12. Normally, these windows are covered by the sliding shutter 16 as the shutter is held in the position of FIGS. 1 and 3 under the force of a spring, not shown,. The shutter 16 has itself formed in its top side a window 24 which comes into register with the housing top window 20 when the shutter is opened as shown in FIG. 2. The bottom side of the shutter 16 has no window but is so narrow that it uncovers the housing bottom window 22 when the shutter is slid to the position of FIG. 2. The shutter 16 is to be opened automatically as the disk cartridge 10 is manually pushed into the disk drive, in the manner, and by the means, to be set forth subsequently.

The disk cartridge 10 for use with the disk drive according to the invention is characterized by a recess or depression 26, FIG. 2, formed in the top side of the cartridge housing 14 and extending along one of the edges bounding the housing window 20. Another similar recess or depression 28, FIG. 1 and 2, is formed in the top side of the shutter 16 extending along one of the edges bounding the shutter window 24. When the shutter 16 is opened as shown in FIG. 2, the shutter recess 28 comes into register with the housing recess 26, providing surfaces that are flush with each other and in coplanar relation to the top surface of the disk 12. The reason for the creation of these recesses 26 and 28 will become apparent in the course of the following description of the disk drive for use with the disk cartridge 10.

Figure 4:
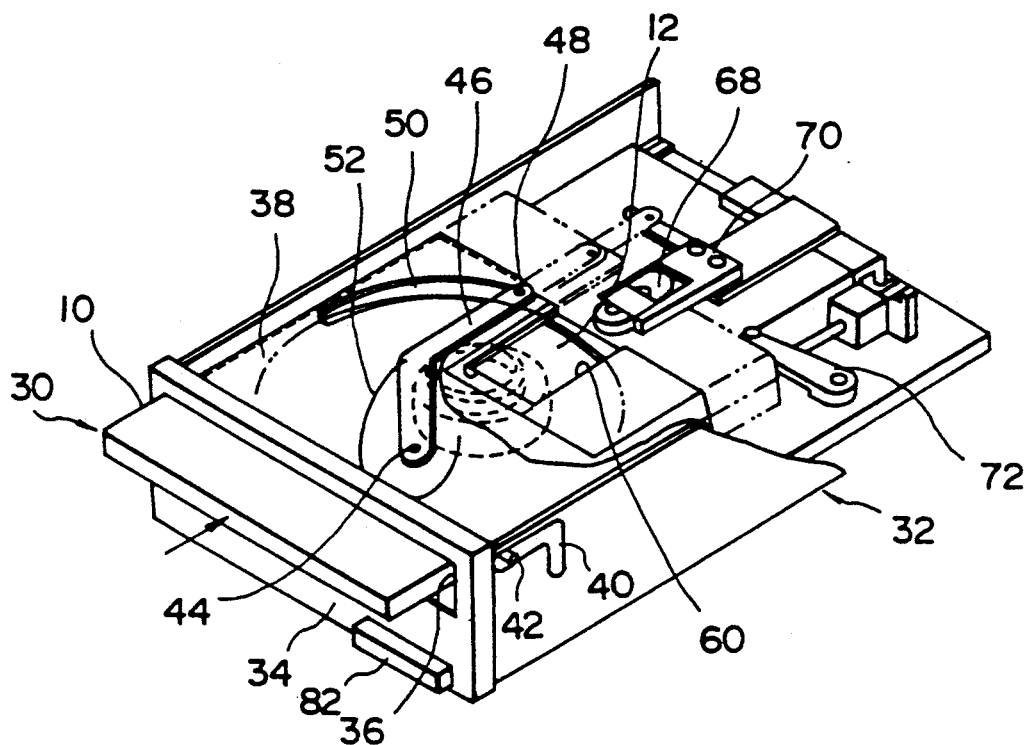
FIG. 4 is a perspective view, partly shown broken away for clarity, of the magnetooptical disk drive embodying the principles of this invention.
Figure 5:
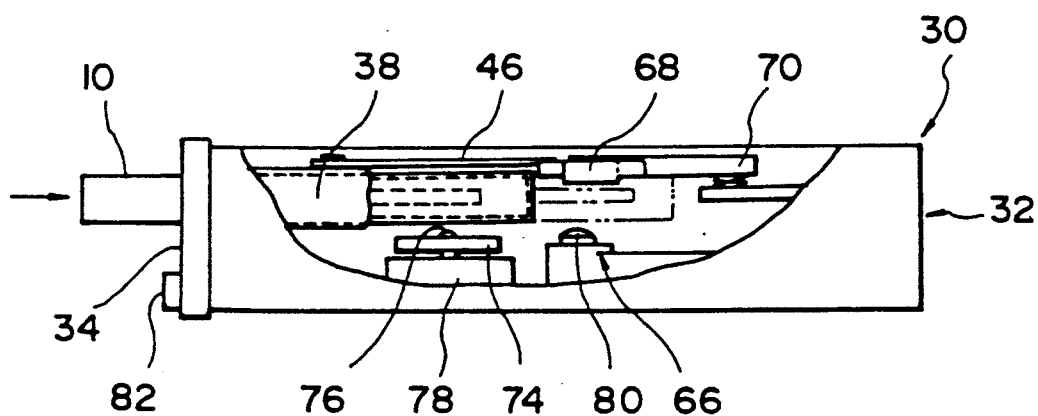
FIG. 5 is a side elevation, partly shown broken away for clarity, of the disk drive of FIG. 4.

Reference is now directed to FIGS. 4 and 5 for the detailed study of the magnetooptical disk drive constructed in accordance with this invention. Generally designated 30, the disk drive has a casing 32 with a front panel 34. This front panel has formed therein an entrance opening or slot 36 extending horizontally for the insertion of the disk cartridge 10. The disk cartridge 10 is to be inserted with its edge bearing the shutter 16 foremost.

Mounted within the disk drive casing 32 is a cartridge cradle 38 for receiving the disk cartridge 10 as the latter is inserted in the entrance slot 36. In this particular embodiment the cartridge cradle 38 is movable with the loaded disk cartridge 10 in a horizontal plane between the solid-line first position and the phantom second position of FIGS. 4 and 5. The cartridge cradle 38 is normally held in the first position in which it butts on the inside surface of the front panel 34. Further the cartridge cradle 38 is movable with the loaded disk cartridge 10 downwardly from the second position. Such horizontal and vertical travel of the cartridge cradle 38 is guided by a pair of L shaped guide slots 40, one seen in FIG. 4, formed in the disk drive casing 32 and slidably receiving a pair of pins 42, also one seen, affixed to the opposite lateral sides of the cartridge cradle.

Unlike the prior art, the dimension of the cartridge cradle 38 in the direction in which the disk cartridge 10 is inserted in the entrance slot 36 is approximately 20 percent less than that of the disk cartridge 10 in this embodiment. Consequently, as shown in FIGS. 4 and 5, the disk cartridge 10 partly projects out of the entrance slot 36 when inserted in the cartridge cradle 38 to the full.

Pivoted at 44 on the cartridge cradle 38, a V-shaped shutter lever 46 acts on the sliding shutter 16 of the disk cartridge 10 for uncovering the cartridge housing windows 20 and 22 as the cartridge is inserted in the cartridge cradle 38 through the entrance slot 36. The shutter lever 46 has a pin 48 depending from its free end and extending with clearance through an arcuate slot 50 in the cartridge cradle 38 for engagement with the cartridge shutter 16. A spring 52, anchored at one end to the cartridge cradle 38, acts on the shutter lever 46 to bias the same in a counterclockwise direction as viewed in FIG. 4.

Figure 6A:
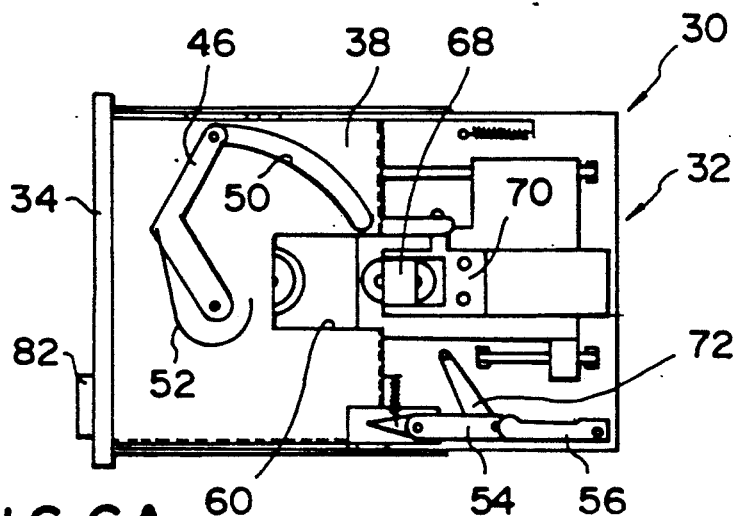
FIGS. 6A, 6B and 6C are a series of top plan views explanatory of how the disk cartridge of FIGS. 1–3 is loaded in the disk drive of FIGS. 4 and 5 and how the sliding shutter of the disk cartridge is opened.
Figure 6B:
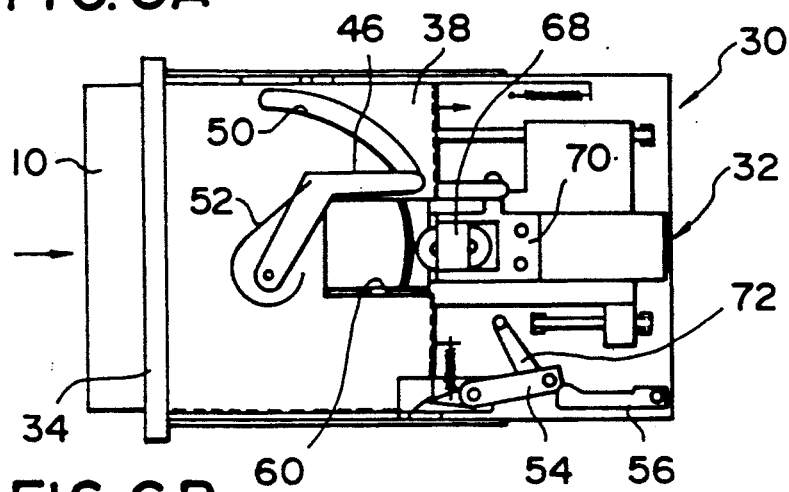
Figure 6C:
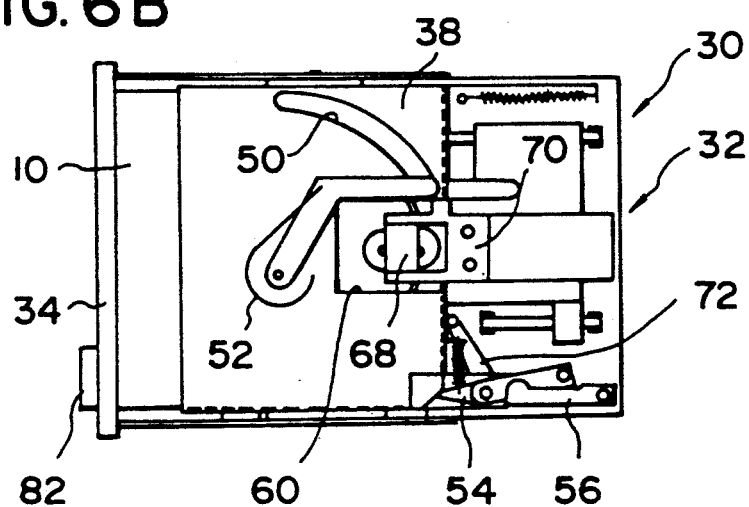

FIGS. 6A-6C are explanatory of how the sliding shutter 16 of the disk cartridge 10 is opened by the shutter lever 46 as the cartridge is loaded in the cartridge cradle 38. As shown in FIG. 6A, the cartridge cradle 38 is held against the front panel 34 of the disk drive casing 32 when the disk cartridge 10 is not loaded. The cartridge cradle 38 is positively locked against movement away from the front panel 34 by a cartridge detect lever 54 butting against a stop 56. The shutter lever 46 is fully turned counterclockwise and held against one extremity of the slot 50 under the bias of the spring 52.

Inserted in the entrance slot 36 in the front panel 34, the disk cartridge 10 will come into contact with the depending pin 48 of the shutter lever 46. Preferably, and as shown in FIGS. 1 and 2, a concavity may be formed at 58 in the housing 14 of the disk cartridge 10 in order to assure positive engagement of the shutter lever pin 48 with the sliding shutter 16.

As the disk cartridge 10 is pushed further into the entrance slot 36, the shutter lever pin 48 will be thereby forced to travel along the arcuate slot 50, causing the shutter lever 46 to turn clockwise from its FIG. 6A position to that of FIG. 6B against the force of the spring 52. The shutter 16 will be slid open as a result of such clockwise turn of the shutter lever 46 combined with the linear travel of the disk cartridge 10.

FIG. 6B shows the disk cartridge 10 fully inserted in the cartridge cradle 38 but still partly protruding from the entrance slot 36. The cartridge cradle 38 is still held against the front panel 34. This is what is herein termed the semiloaded position of the disk cartridge 10. The shutter 16 has been fully opened by the time, or just when, the disk cartridge 10 arrives at this semiloaded position. The cartridge cradle 38 has formed therein a window 60 extending toward the front panel 34 from its rear end. The registered cartridge housing window 20 and cartridge shutter window 24 come into register with the cartridge cradle window 60 when the disk cartridge 10 is carried to the semiloaded position, so that the desired radial portion of the data storage disk 12 is exposed through all these windows 20, 24 and 60. The shutter lever 46 is bent into the shape of a V so as not to overhang the registered windows 20, 24 and 60.

At 62 in FIG. 2 is seen another concavity formed in the disk cartridge housing 14 in order to receive the shutter lever pin 48 when the shutter 16 is fully opened. The cartridge shutter 16 can thus be firmly held in its open position. It will also be noted from FIG. 6B that the cartridge detect lever 54 is pivoted counterclockwise by slidably engaging bevel 64 of the disk cartridge housing 14 when the disk cartridge 10 arrives at the semiloaded position. When pivoted counterclockwise, the cartridge detect lever 54 moves out of abutting engagement with the stop 56 so that the cartridge cradle 38 becomes free to travel away from the front panel 34 with the disk cartridge.

FIG. 6C shows the disk cartridge 10 subsequently fully pushed into the entrance slot in the front panel 34 whereby cartridge cradle 38 will travel away from the front panel 34 with the disk cartridge 10. The disk cartridge 10 is now in what is herein called the fully loaded position. It should be noted that the disk cartridge 10 has traveled from the semiloaded position of FIG. 6B to the fully loaded position of FIG. 6C with its shutter 16 held open by the shutter lever 46 in accordance with a novel feature of this invention. The disk cartridge 10 is to be subsequently lowered with the cartridge cradle 38 from the fully loaded position to a data transfer position for data transfer with an optical data transducer seen at 66 in FIG. 5.

With reference back to both FIGS. 4 and 5 the disk drive 30 has an electromagnet assembly 68 for biasing the magnetooptical disk 12 of the disk cartridge 10 during its data transfer with the data transducer 66. The electromagnet assembly 68 is supported by a carriage 70 for joint up and down movement therewith.

Normally, as well as during the above explained travel of the cartridge cradle 38 between the semiloaded and fully loaded positions, the electromagnet assembly 68 is held raised in its standby position, as depicted in all of FIGS. 4, 5 and 6A-6C. This standby position is such that the exposed radial portion of the data storage disk 12 comes under the electromagnet assembly 68 when the disk cartridge 10 arrives at the fully loaded position with the cartridge cradle 38. The electromagnet assembly 68 is received, at least in part, in the registered cartridge housing window 20, cartridge shutter window 24 and cartridge cradle window 60.

A reconsideration of FIG. 6C will indicate that a tripping lever 72 has been pivoted clockwise from its FIGS. 6a and 6B position by the cartridge cradle 38 as the disk cartridge 10 comes to the fully loaded position. The tripping lever 72 when so pivoted trips a locking mechanism, not shown, which has held the cartridge cradle 38 in the raised position. Then the cartridge cradle 38 will descend to carry the disk cartridge 10 to the noted data transfer position.

The disk drive 30 conventionally comprises a drive hub 74, FIG. 5, mounted fast on a spindle 76 which is herein shown as the armature shaft of an electric drive motor 78. Thus the drive hub 74 is driven directly by the drive motor 78. The drive hub 74 is provided with a known chucking magnet or magnets, not shown, for driving engagement with the disk hub 18, FIG. 2, of the disk cartridge 10.

Lowered as aforesaid to the data transfer position with the cartridge cradle 38, the disk cartridge 10 has its sheet-metal disk hub 18 chucked by the drive hub 74. The vertical position of the drive hub 74 is so determined in relation to the data transfer position of the disk cartridge 10 that the data storage disk 12 is thereby supported out of contact with the inside surfaces of the cartridge housing 14. Also, when the disk cartridge 10 is in the data transfer position, the objective 80, FIG. 5, of the data transducer 66 is opposed to the exposed radial portion of the data storage disk 12 through the cartridge housing window 22, FIG. 3, and a window, not shown, in the cartridge cradle 38.

The electromagnet assembly 68 is also lowered from its standby position to a working position with the cartridge cradle 38. The clearance between the data storage disk 12 in the data transfer position and the electromagnet assembly 68 in the working position may be approximately 0.6 millimeter.

Data transfer between disk 12 and transducer 66 is effected with the disk rotated at a constant speed of 3600 revolutions per minute and with the transducer moved radially of the disk. The electromagnet assembly 68 is energized for generating a magnetic field needed for magnetooptically writing data on the disk 12.

The user may press an eject button 82 on the front panel 34 of the casing 32 upon completion of a desired run of data transfer. Thereupon the disk cartridge 10 will ascend to the fully loaded position of FIG. 6C with the cartridge cradle 38. The electromagnet assembly 68 will also return to the standby position with the ascent of the cartridge cradle 38. Then the disk cartridge 10 will travel horizontally to the semiloaded position of FIG. 6B with the cartridge cradle 38. As the user subsequently pulls the disk cartridge 10 out of the entrance slot 36, the cartridge shutter 16 will be closed automatically with the return of the shutter lever 46 from its FIG. 6B position to that of FIG. 6A under the force of the spring 52.

The reader's attention is invited to the fact that the shutter 16 of the disk cartridge 10 is fully opened by the time, or just when, the cartridge is pushed to the semiloaded position of FIG. 6B, instead of to the fully loaded position as in the prior art. The disk cartridge 10 subsequently travels from the semiloaded to the fully loaded position with the shutter 16 held open. Accordingly, the electromagnet assembly 68 being held in its standby position can be admitted into the registered cartridge housing window 20 and cartridge shutter window 24 through the cartridge housing recess 26 and cartridge shutter recess 28. It has been stated that these recesses 26 and 28 are in coplanar relation to the top side of the data storage disk 12. The standby position of the electromagnet assembly 68 according to this invention can be made lower than that according to the prior art, affording a reduction in the vertical dimension of the disk drive 30.

Figure 7:
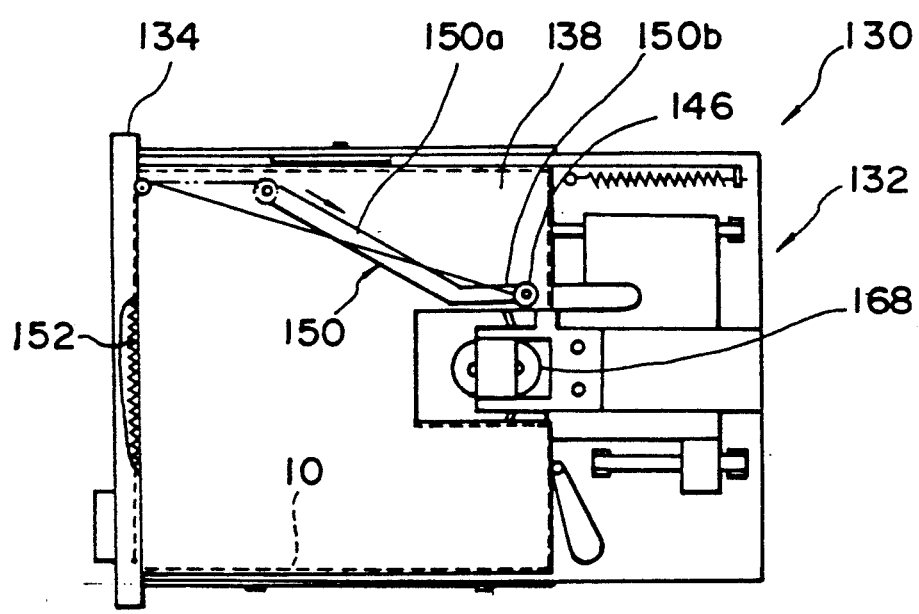
FIG. 7 is a top plan of another preferred embodiment of the magnetooptical disk drive in accordance with the invention.

This objective of the invention is attainable if, unlike the foregoing embodiment, the cartridge cradle is not movable with the loaded disk cartridge between the semiloaded and fully loaded positions. FIG. 7 shows another preferred magnetooptical disk drive 130 according to the invention which embodies this alternative construction.

The alternative disk drive 130 has a cartridge cradle 138 which is movable relative to a disk drive casing 132 only in a direction normal to the plane of the disk cartridge to be received therein. The inside dimension of the cartridge cradle 138 in the direction in which the disk cartridge is inserted therein is approximately the same as the dimension of the disk cartridge in that direction. The cartridge cradle 138 has formed therein a guide slot 150 comprised of two straight portions 150a and 150b joined at an obtuse angle to each other. The first straight portion 150a, situated closer to the front panel 134, extends at an angle to the direction of cartridge insertion. The second straight portion 150b extends in the direction of cartridge insertion.

Slidably engaged in the guide slot 150 is a shutter pin 146 which extends into the cartridge cradle 138 and which is suitably prevented from disengagement from the guide slot. A spring 152 acts between disk drive casing 132 and shutter pin 146 to bias the latter toward the front panel 134 and to normally hold the shutter pin at one extremity of the guide slot 150 adjacent the front panel.

Thus, upon insertion of the disk cartridge 10 in the entrance slot in the front panel 134, the cartridge shutter 16 will be fully opened by the sliding shutter pin 146 just when, or by the time, the disk cartridge arrives at the semiloaded position. The shutter pin 146 will slide only along the first portion 150a of the guide slot 150 for opening the cartridge shutter 16. Therefore, the shutter pin 146 will be positioned at the junction between the two portions 150a and 150b of the guide slot 150 when the disk cartridge arrives at the semiloaded position with its shutter fully opened. Then, as the disk cartridge is pushed further from the semiloaded to the fully loaded position, the shutter pin 146 will travel along the second portion 150b of the guide slot 150, holding the shutter open.

The alternative disk drive 130 can be similar in the other details of construction to the disk drive 30 disclosed previously. It will therefore be understood that the standby position of the electromagnet assembly 168 of this disk drive 130 can also be made so close to the data storage disk as to permit a substantial reduction in the vertical thickness dimension of the disk drive.

FIGS. 8–12 are intended to illustrate by way of reference a preferable form of means for transporting the disk cartridge 10 between the fully loaded position and data transfer position with the cartridge cradle in the magnetooptical disk drive constructed as in the foregoing embodiments of this invention. As will be understood from FIGS. 8 and 9 in particular, the disk drive 230 illustrated in these figures comprises a casing 232 with a front panel 234 having an entrance slot 236 and an eject button 238, a cartridge cradle 240 mounted within the casing for carrying the loaded disk cartridge 10 between the fully loaded position and the data transfer position, an electromagnet assembly 242, and a disk drive motor 244 coupled to a drive hub 246.

Figure 10:
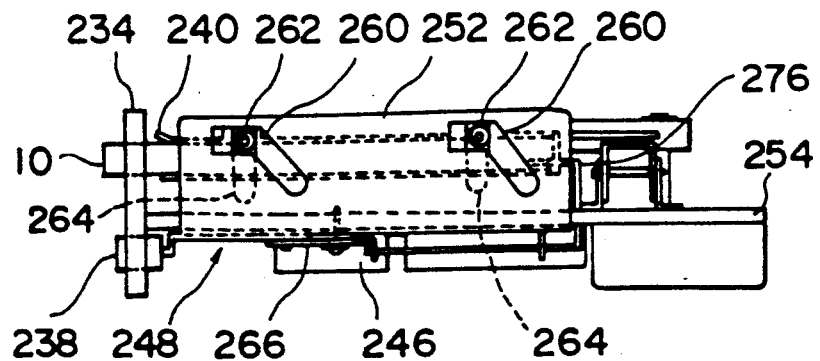
FIG. 10 is a side elevational-view of the internal construction of the disk drive of FIG. 8.
Figure 11:
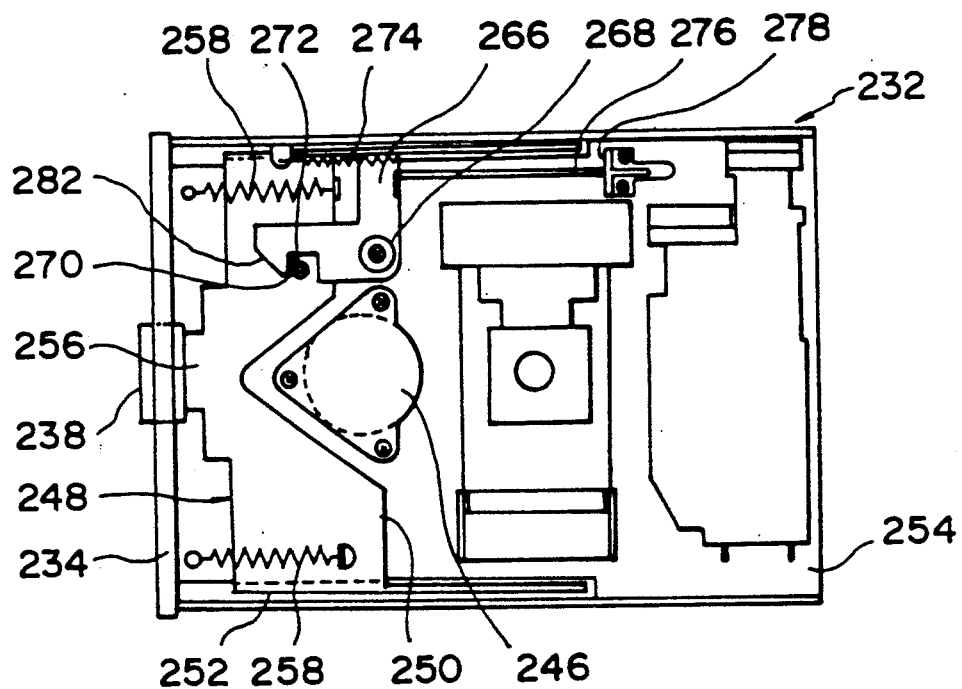
FIG. 11 is a bottom plan view of the internal construction of the disk drive of FIG. 8.

For the desired up and down travel of the cartridge cradle 240 there is provided a reciprocator 248, FIGS. 10 and 11, in the form of a punching of sheet metal bent into the shape of a U to provide a horizontal major portion 250 and a pair of vertical side portions 252. The reciprocator major portion 250 underlies a fixed platform 254 within the casing 232. A tongue 256 extending forwardly from the reciprocator major portion 250 is coupled to the eject button 238, so that the reciprocator 248 travels away from the front panel 234 upon depression of the eject button. A pair of helical tension springs 258 urges the reciprocator 248 forwardly, normally holding the eject button 238 projecting from the front panel 234.

Disposed on the opposite sides of the cartridge cradle 240, the pair of reciprocator side portions 252 have each a pair of slanting slots 260 formed in horizontally spaced positions thereon. The cartridge cradle 240 has rotatably mounted to its opposite side edges two pairs of rollers 262 which are rollably engaged one in each slanting slot 260. The cartridge cradle rollers 262 are also rollably engaged one in each vertical guide slot 264 in the casing 232 of the disk drive 230. Thus the cartridge cradle 240 is constrained to up and down motion with the horizontal reciprocation of the reciprocator 248 relative to the disk drive casing 232.

Figure 12:
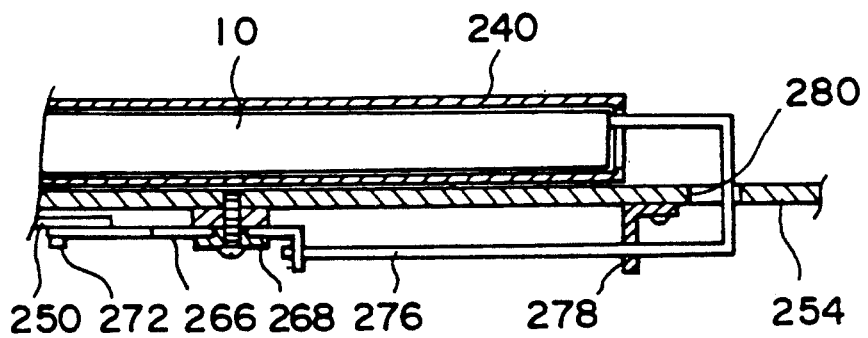
FIG. 12 is an enlarged, fragmentary vertical cross showing some essential parts of the disk drive of FIG. 8.

At 266 in FIGS. 11 and 12 is seen an L-shaped locking lever or bell crank disposed on the underside of the platform 254 and pivoted at 268 thereto. The locking lever 266 is recessed at 270 for engaging and disengaging a roller 272 on the reciprocator major portion 250. Another helical tension spring 274 on the underside of the platform 254 biases the locking lever 266 to turn counterclockwise, as viewed in FIG. 11, normally holding the locking lever in locking engagement with the reciprocator 248.

All of FIGS. 8-12 show at 276 a cartridge detect rod generally extending in the direction in which the disk cartridge 10 is inserted in the entrance slot 236. Mostly disposed under the platform 254 as best shown in FIG. 12, the cartridge detect rod 276 has one end coupled fast to the locking lever 266 and slidably extends through a hole in a lug 278 on the platform 254. Further the cartridge detect rod 276 has the other end portion bent into the shape of a U to extend through a clearance slot 280 in the platform 254 and is inserted in the cartridge cradle 240. The cartridge detect rod 276 is to be pushed away from the front panel 234 by the disk cartridge 10 upon its full insertion in the cartridge cradle 240.

Figure 8:
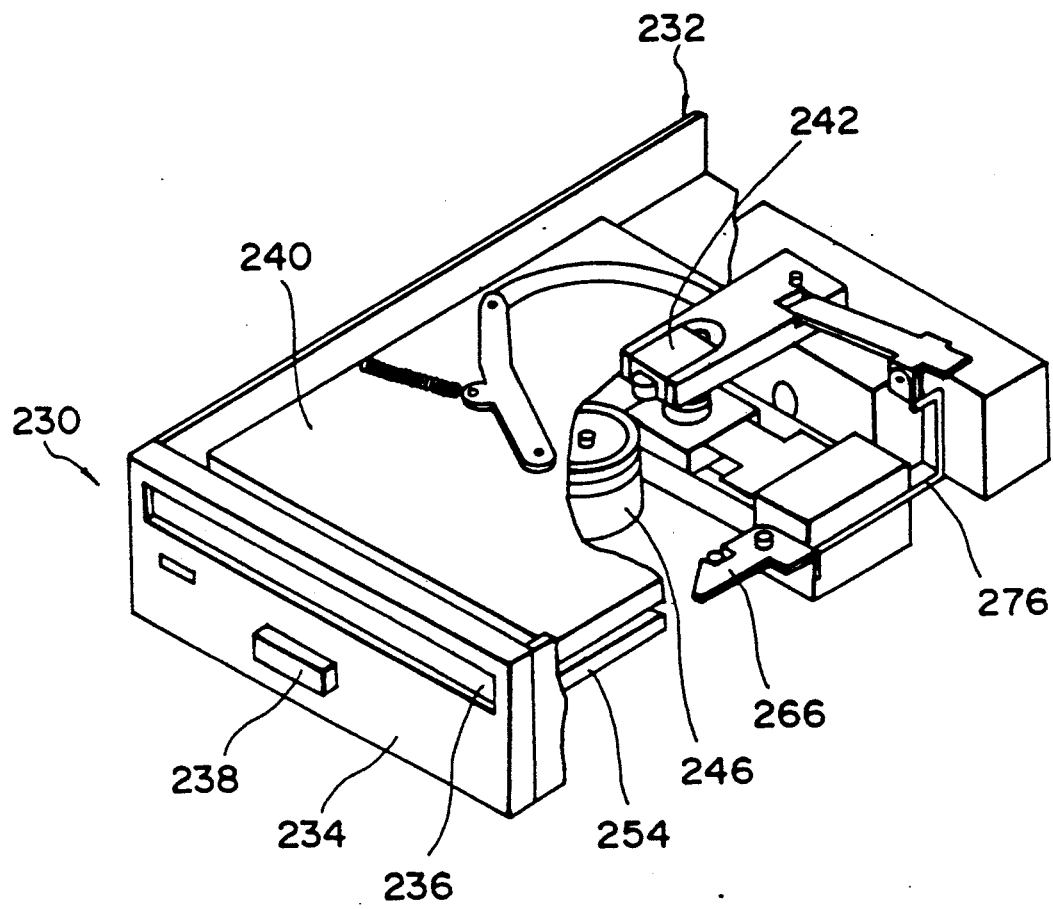
FIG. 8 is a perspective view, partly shown broken away for clarity, of a magnetooptical disk drive incorporating means for moving the disk cartridge between the fully loaded position and the data transfer position, such means being suitable for use with the disk drive of FIGS. 4 and 5.
Figure 9:
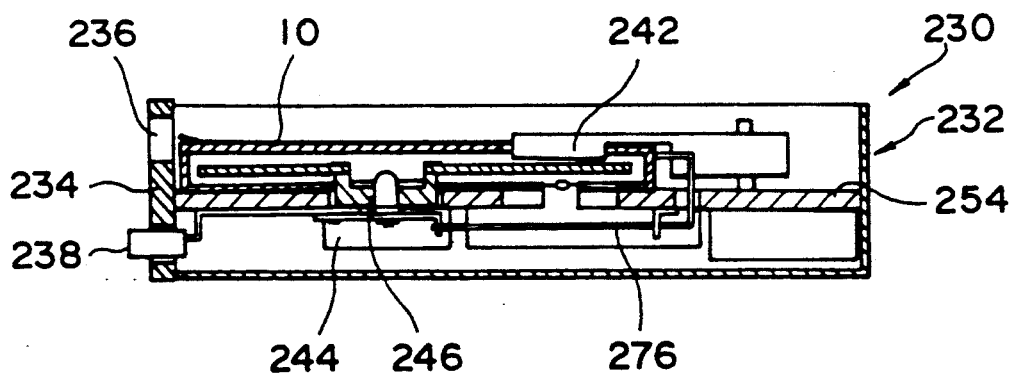
FIG. 9 is a vertical cross-sectional-view through the disk drive of FIG. 8.

Normally, when the cartridge cradle 240 is held raised as shown in FIGS. 8 and 10, the locking lever 266 engages the roller 272 under the bias of the tension spring 274. The reciprocator 248 is thus locked in a position away from the front panel 234 against the force of the tension spring pair 258, as shown in FIG. 11.

Then, upon full insertion of the disk cartridge 10 in the entrance slot 240, the cartridge detect rod 276 will be thereby pushed away from the front panel 234, as best depicted in FIG. 12. Thereupon the locking lever 266 will turn clockwise, as viewed in FIG. 11, against the force of the tension spring 274 thereby unlocking the reciprocator 248. The reciprocator 248 will then travel toward the front panel 234 under the force of tension spring pair 258.

As has been stated with reference to FIG. 10, the two pairs of rollers 262 on the cartridge cradle 240 are rollably engaged in the slanting slots 260 in the side portions 252 of the reciprocator 248 and in the vertical slots 264 in the casing 232. Therefore, with the noted forward travel of the reciprocator 248, the cartridge cradle 240 will be lowered to carry the loaded disk cartridge 10 to the data transfer position.

The eject button 238 may be depressed for causing the ascent of the disk cartridge 10 to the FIG. 10 position. The reciprocator 248 will travel away from the front panel 234 against the bias of the tension spring pair 258 with the depression of the eject button 238. The disk cartridge 10 will ascend to the FIG. 10 position as the two pairs of rolls 262 thereon roll up the slanting slots 260 in the reciprocator 248. Then the locking lever 266 will lock the reciprocator 248 in the FIG. 11 position as the roller 272 on the reciprocator becomes engaged in the locking lever recess 270 after rolling over a bevel 282, FIG. 11, of the locking lever.

Attention should be paid to the fact that the locking lever 266 and other means for releasably locking the reciprocator 248 are mostly disposed under the platform 254, instead of between the platform and the cartridge cradle. This arrangement is preferable for the desired reduction of the vertical dimension of the disk drive.

Another advantage of the disk drive 230 is the reduced distance between the vertical positions of the eject button 238 and the reciprocator 248. The finger pressure exerted on the eject button 238 can thus be more effectively translated into the horizontal movement of the reciprocator.

As has been mentioned in connection with the magnetooptical disk drives 30 and 130 in accordance with this invention, the electromagnet assembly 68 or 168 must travel up and down between the standby position and working position in step with the up and down movement of the loaded disk cartridge 10 between the fully loaded position and data transfer position with the cartridge cradle 38 or 138. However, the electromagnet assembly cannot be coupled directly to the cartridge cradle. For, even though the standby position of the electromagnet assembly ca be made closer to the fully loaded position of the disk cartridge in accordance with the present invention, the electromagnet assembly when moved to its working position must be even closer to the surface of the data storage disk being held in its data transfer position. The stroke of the electromagnet assembly must therefore be greater than that of the cartridge cradle. An electric motor with a motion translating mechanism such as a rack and pinion arrangement has been usually employed for such up and down travel of the electromagnet assembly. This familiar drive mechanism is objectionable because of its large space requirement, heaviness, and power requirement. The power requirement of the motor is not negligible particularly if the disk drive is battery driven.

Figure 13:
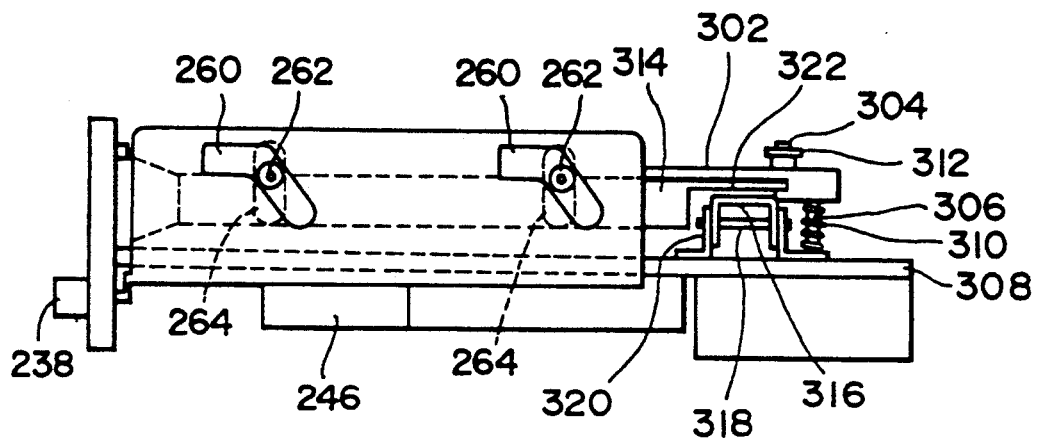
FIG. 13 is a side elevational-view of the internal construction of another embodiment of the magnetooptical disk drive of the invention incorporating means for moving the electromagnet assembly between the standby position and the working position, such means being suitable for use with the disk drive of FIGS. 4 and 5.
Figure 14:
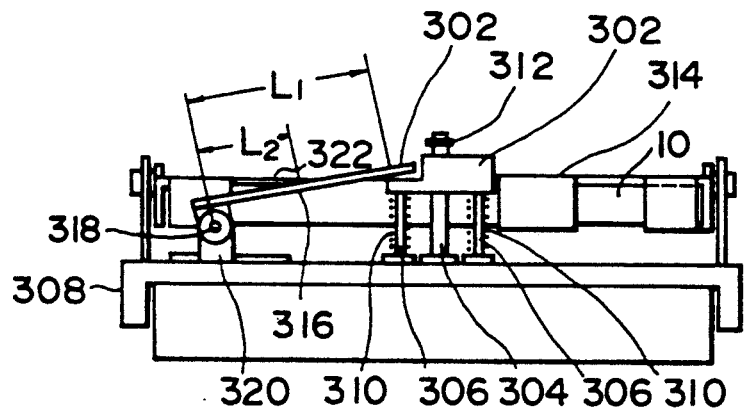
FIG. 14 is a right hand side elevational view of FIG. 13.
Figure 15A:
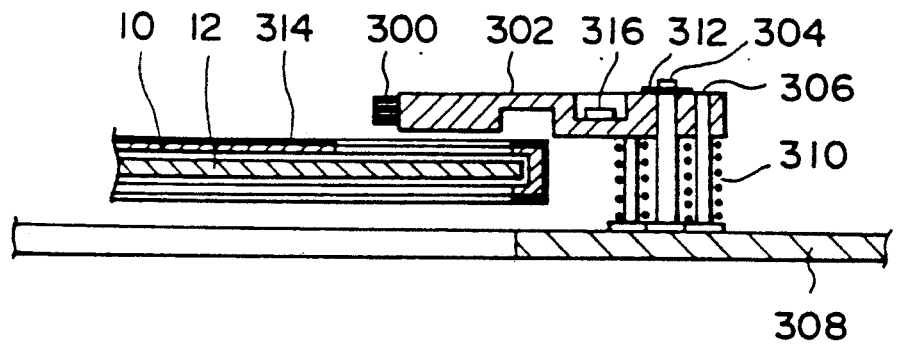
FIGS. 15A and 15B are a series of fragmentary vertical cross-sectional view explanatory of how the electromagnet assembly is moved between the standby position and the working position in the disk drive of FIGS. 13 and 14.
Figure 15B:
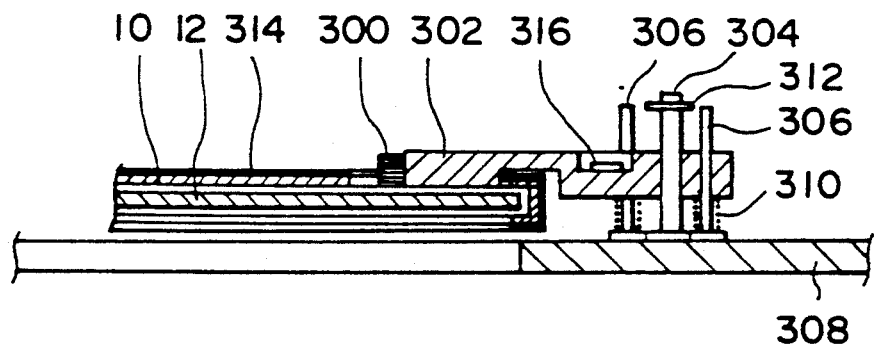

Accordingly, in order to derive the full benefits from the present invention, the conventional motor drive may be replaced by the following drive linkage, illustrated in FIGS. 13 and 14, between cartridge cradle and electromagnet assembly. FIGS. 15A and 15B are explanatory of how the electromagnet assembly is moved up and down by the drive linkage.

The electromagnet assembly, designated 300, is mounted fast to a carriage 302. The electromagnet carriage 302 is slidably mounted to a primary post 304 and two auxiliary posts 306 erected on a platform 308. Two helical compression springs 310 are sleeved one upon each auxiliary post 306 to urge the carriage 302 upwardly. A stop 312 is secured to the primary post 304 to limit the upward movement of the electromagnet carriage 302 in the normal, standby position of the electromagnet assembly 300.

For the desired descent of the electromagnet assembly 300 from the standby position of FIG. 15A to the working position of FIG. 15B in step with the descent of the cartridge cradle 314, but over a distance greater than the distance of descent of the cartridge cradle, there is provided the noted drive linkage comprising a lever 316 having one end pinned at 318 between a pair of lugs 320 on the platform 308 for pivotal movement in a vertical plane. The other, free end of the lever 316 rests upon the electromagnet carriage 302. The cartridge cradle 314 has an arm 322 extending therefrom and held against a midpoint of the lever 316 from above.

Thus, with the descent of the cartridge cradle 314, its arm 322 will act on the lever 316, causing the latter to pivot clockwise, as viewed in FIG. 14, about the pivot pin 318. The electromagnet carriage 302 will then descend from its FIG. 15A position to that of FIG. 15B against the forces of the compression springs 310.

As indicated in FIG. 14, the lever 316 is herein used as the so called third class of lever, in which the lever arm $L_1$ of the load is more than the lever arm $L_2$ of the applied force. The stroke of the electromagnet carriage 302 is therefore longer than the stroke of the cartridge cradle 314; namely, $L_1/L_2$ = carriage stroke/cradle stroke.

The electromagnet assembly 300 can thus be lowered a distance greater than the stroke of the cartridge cradle 314 and can be positively held in the required working position in which the clearance between the data storage disk 12 of the disk cartridge 10 and the electromagnet assembly 300 is, typically, 0.6 millimeter. No devoted actuator is required for such travel of the electromagnet assembly between the standby and working positions, so that the disk drive can be further reduced in size and weight and made lower in power requirement.

Despite the foregoing detailed disclosure, it is not desired that the present invention be limited by the exact details of the illustrated embodiments. A variety of modifications and alterations will suggest themselves to one skilled in the art on the basis of this disclosure. For example, the electromagnet assembly may be replaced by any equivalents means capable of generating a magnetic field for biasing the magnetooptical data storage disk during its data transfer with the optical data transducer. Also, according to the broadest aspect of this invention, the disk cartridge may not necessarily be moved relative to the casing between the fully loaded position and the data transfer position; instead, the platform carrying the disk drive motor, the optical data transducer, etc., may be moved up and down relative to the casing. All these and other changes that will readily occur to the specialists are considered to fall within the scope of this invention as expressed by the following claims.

I claim:

1. In a disk drive for a magnetooptical disk cartridge of the type having a magnetooptical data storage disk rotatably enclosed in a generally flat, boxlike housing having a sliding shutter mounted astraddle one edge of the housing for movement between an open and a closed position to open and close a pair of access windows formed in opposite sides of the housing, and a window in one side of the shutter aligned with one of the access windows when in the open position, the improvement comprising:

a disk drive casing having an entrance opening for the insertion of said magnetooptical disk cartridge, with said one edge of said cartridge housing forward, through said entrance opening and sequentially to a respective semiloaded position and a fully loaded position within said casing, said semiloaded position being in predetermined spaced relationship between said fully loaded position and said entrance opening;

a cartridge cradle movably mounted within said casing for receiving said disk cartridge when said disk cartridge is inserted in said entrance opening and for linear movement with said disk cartridge when said disk cartridge is moved between said semiloaded and fully loaded positions, and cartridge cradle having a dimension in the direction of insertion thereof that is less than the dimension of said disk cartridge in said direction of insertion;

means for normally retaining said cartridge cradle in said semiloaded position of said disk cartridge;

shutter opening means on said cartridge cradle engageable with the shutter for opening said shutter on said disk cartridge when said disk cartridge is correctly inserted in said entrance opening, so that said shutter is in said open position when said disk cartridge is in said semiloaded position;

field generating means in said casing for generating a magnetic field for biasing said data storage disk through one of said access windows in said housing of said disk cartridge, said field generating means being held, during loading of said disk cartridge, in a predetermined standby position where said one window in said cartridge housing is disposed adjacent to and opposite said field generating means when said disk cartridge is in said fully loaded position;

recess means in said housing and shutter of said disk cartridge adjacent said one window in said cartridge housing and said window in said shutter to facilitate positioning said field generating means in said one window in said cartridge and said window in said shutter so that said field generating means is in close proximity to said storage disk in a direction normal to the plane of said disk cartridge when in said standby position;

bevel means at one corner of said disk cartridge at said one edge of said housing on which said shutter is mounted;

cartridge detector lever means pivotally mounted in said casing and slidingly engageable with said bevel means when said disk cartridge is correctly inserted into said casing for pivotally moving said detector lever means from a normal blocking position to a non-blocking position; and stop means in said casing engaging said detector lever means in said normal blocking position and disengaged from said detector lever means when said detector lever means is pivoted to said non-blocking position, so that when said disk cartridge is correctly inserted, said bevel means engages said detector lever means and pivots said detector lever means from said normal blocking position to said non-blocking position disengaging said detector lever means from said stop means to facilitate complete insertion of said disk cartridge into said casing, and when said disk cartridge is inserted incorrectly, said detector lever means engages said disk cartridge and is retained by said stop means in said normal blocking position to prevent further insertion of said disk cartridge.

2. The disk drive as claimed in claim 1, wherein said shutter opening means comprises:

a shutter lever having one end pivotally mounted on said cartridge cradle;

a guide slot in said cartridge cradle;

pin means on said shutter lever at a position spaced from said one end and extending through said guide slot for engagement with said shutter when said disk cartridge is inserted correctly through said entrance opening into said casing; and resilient means between said cartridge cradle and said lever for resiliently urging said shutter lever toward an initial position so that said pin means in said initial position engages said shutter when said disk cartridge is inserted correctly into said casing and is guided by said guide slot to open said shutter as said disk cartridge moves into said semiloaded position.

* * * * *